United States Patent [19]

Iwata et al.

[11] 4,223,712

[45] Sep. 23, 1980

[54] PNEUMATIC TIRE FOR HEAVY DUTY VEHICLES

[75] Inventors: Norio Iwata, Kodaira; Hiroshi Kojima, Hino, both of Japan

[73] Assignee: Bridgestone Tire Company, Limited, Tokyo, Japan

[21] Appl. No.: 937,374

[22] Filed: Aug. 28, 1978

[30] Foreign Application Priority Data

Sep. 1, 1977 [JP] Japan .................................. 52-104160

[51] Int. Cl.$^2$ ........................ B60C 11/08; B60C 11/06
[52] U.S. Cl. ............................... 152/209 D; D12/143; D12/146; 152/330 A; 152/354 RB
[58] Field of Search ........... 152/209 D, 209 R, 209 B, 152/209 WT, 330 A, 354 RB, 352 R; D12/142, 143, 146, 147, 149, 151

[56] References Cited

U.S. PATENT DOCUMENTS

| D. 89,393 | 3/1933 | Gilbert | 152/209 D UX |
|---|---|---|---|
| 3,584,670 | 6/1971 | Verdier | 152/209 R |

FOREIGN PATENT DOCUMENTS

| 754438 | 8/1956 | United Kingdom | 152/209 R |
|---|---|---|---|
| 1254766 | 11/1971 | United Kingdom | 152/209 D |

Primary Examiner—John T. Goolkasian
Assistant Examiner—Thomas Bokan
Attorney, Agent, or Firm—Sughrue, Rothwell, Mion, Zinn and Macpeak

[57] ABSTRACT

A pneumatic tire for heavy duty vehicles comprises a tread divided by two circumferential zigzag grooves in a tread center zone including block patterns of elongated blocks circumferentially discontinuous with traverse grooves and side zones including circumferentially continuous ribs. The traverse grooves are provided in their mid portions 30–70% of their lengths with platforms making the grooves shallower 30–70% than their original depths. The pattern of the tread converts into a pattern of ribs formed by the circumferential zigzag grooves having branch grooves when the tread has worn more than 30–70%. The tire including the above tread pattern according to the invention is suitable for both use on paved hard roads and weak grounds.

10 Claims, 11 Drawing Figures

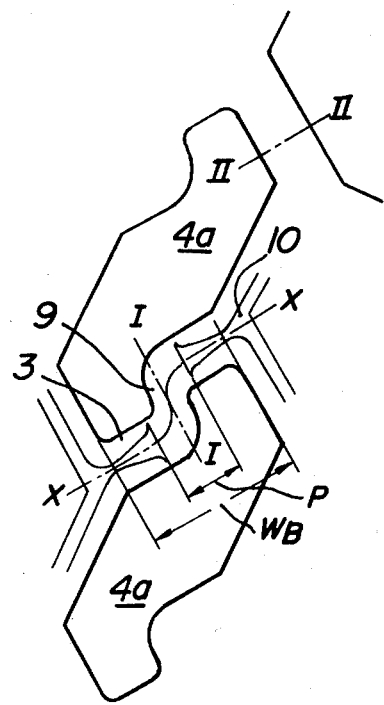
FIG._4
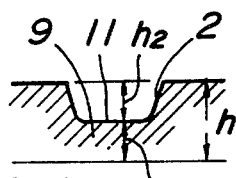
FIG._4a
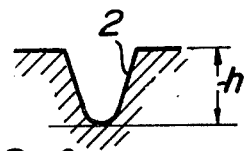
FIG._4b
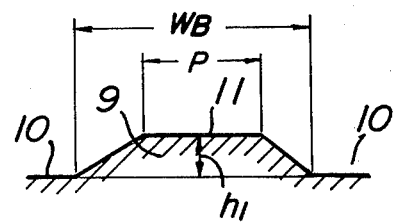
FIG._4c

PNEUMATIC TIRE FOR HEAVY DUTY VEHICLES

BACKGROUND OF THE INVENTION

1. Field of the Invention

The present invention relates to a pneumatic radial tire for use in large-sized heavy duty vehicles such as trucks, trailers and the like, more particularly to a heavy duty flat wide base radial tire, and more particularly to a pneumatic radial tire for continuously travelling at high speeds on usual paved hard roads while suitable for use in heavy duty cars such as dump trucks, concrete mixer trucks, garbage trucks or motor trucks for refuse collection and the like which are used on weak grounds other than roads for transporting or conveying debris, building materials, earth and sand in site of construction and diggings.

2. Description of the Prior Art

Tires having tire treads adapted to be used both on paved hard roads and weak grounds have been suggested in for example, U.S. Pat. No. 3,645,314 which include circumferentially elongated longitudinal blocks in a center zone and transversely elongated lateral blocks in side zones in the tread, these blocks being arranged so as to improve the cohesion among the blocks. The tires of this type have generally exhibited a superiority on weak grounds. In continuously travelling at high speeds under a heavy loaded condition on hard roads, however, they have often encountered various failures due to heating accumulated in the tire and decrease of life due to rapid wear in the tread rubber and irregular wear.

SUMMARY OF THE INVENTION

It is an object of the present invention to provide an improved pneumatic radial tire suitable for use on relatively weak grounds other than roads, although it is mostly used for continuous travelling with heavy loads on hard roads.

Another object of the present invention is to provide a pneumatic tire which mitigates or eliminates the disadvantages in the prior art tires for on-road and off-road, such as breakdown due to overheating, decrease of travelling life due to rapid wear and irregular and local wear increase of fuel consumption due to increased rolling resistance, and increase of noise, when continuously travelling with heavy loads on hard roads which are most part of travelling passages and fulfills requirements when used on weak grounds.

Recently, vehicles having lower floors have been developed and there has been a remarkable tendency for single wheels to be used in substitution for double wheels for dump trucks, concrete mixer trucks, garbage trucks and the like. For this purpose, flat wide base tires having large load support capacity have been required. A wide base tire applied with block type tread patterns of conventional tires for on-road and off-road may contact a ground with uneven distribution of ground contact pressure because of the great widths of the tread and tire and cause rapid wear in side zones of the tread to decrease the life considerably due to the wear. It is difficult for such a tire to reduce failures due to heating and increase its life by an improved wear-resistance.

It is therefore another object of the present invention to provide a flat wide base tire having a large load support capacity suitable for both use in on-road and off-road.

In order that the invention may be more clearly understood, preferred embodiments will be described, by way of example, with reference to the accompanying drawings.

BRIEF DESCRIPTION OF THE DRAWINGS

FIG. 4 is a partially enlarged view of the tread groove in FIG. 3;

FIG. 4a is a sectional view taken along a line I—I in FIG. 4;

FIG. 4b is a sectional view taken along a line II—II in FIG. 4;

FIG. 4c is a sectional view taken along a line X—X in FIG. 4;

DETAILED DESCRIPTION OF THE PREFERRED EMBODIMENT

Figure 5:
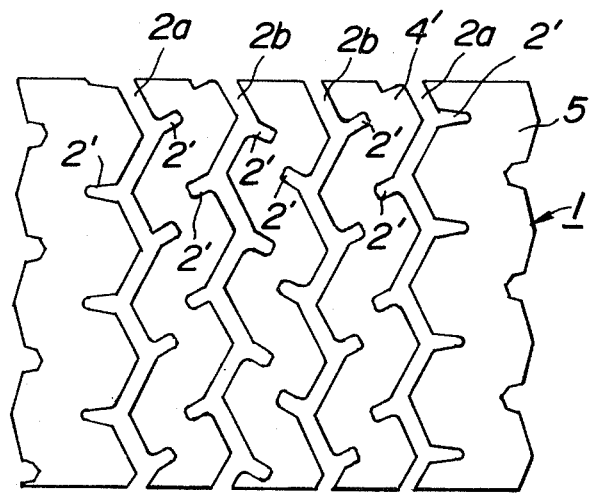
FIG. 5 is a development view of a tread according to the invention showing a pattern when the tread has worn 50%.

A tread 1 of a tire according to the present invention is divided by two circumferential zigzag grooves 2a into a tread center zone $T_c$ and remaining side zones $T_s$ consisting of circumferentially continuous ribs 5. The center zone $T_c$ includes a block pattern consisting of a single row or plural rows of blocks circumferentially divided by traverse or bias grooves 3 having uneven depths as described later. In case of plural rows of blocks, appropriate rows of circumferential zigzag grooves 2b are arranged which have a depth substantially the same as that of the circumferential zigzag grooves 2a. The traverse or bias grooves 3 in the center zone $T_c$ are provided in their center portions 30-70% of their length with platforms 9. The bias grooves 3 have at the locations of the platforms a depth $h_2$ 30-70% shallower than that h of the grooves 3, so that the pattern in the tread consists of the blocks 4 and ribs 5 when the tread has not been worn at an initial stage but it converts into a rib pattern consisting of ribs 4' and 5 formed by the circumferential zigzag grooves 2a and 2b having branch grooves 2' when it has been worn more than 30-70% as shown in FIG. 5.

When the tire is new or in an initial stage of use, failures of the tire due to heating during continuous high speed travelling under a heavy load can be reduced by a heat dissipation owing to the blocks in the center zone $T_c$ and a heat build-up reduction effect resulting from an effective restriction of movements of the blocks by the platforms. A cut-off chipping can be prevented by the reduced rigidity of the center zone $T_c$ owing to the blocks. In general, the cut-off chipping often occurs in a tread during off-road travelling. In an initial stage of the chipping, a number of relatively small cuts occur in a tread surface and the rubber loses its elasticity due to fatigue to produce hardened spots which are then torn off as pockmarks. Furthermore irregular wear in the both tread side zones $T_s$ can be effectively avoided to lengthen its span life remarkably, by forming the both side zones $T_s$ of the circumferentially continuous ribs having a high rigidity during the earlier and latter stages and further reinforcing the side zones $T_s$ of more than 60%, preferably 75–100% which are 20–42% of the effective belt width BW by the belts as tension members having a high circumferential rigidity. In addition, during the latter period the block patterns in the center zone will disappear so as to form rib patterns as a whole, so that the tire according to the present invention is remarkably superior in wear-resistance to those of the block patterns in the prior art. The tire according to the present invention is satisfactory to a traction performance required for these tires owing to the effective functions of the block patterns in the center zone during the initial stage of use and the rib patterns formed by the circumferential zigzag grooves and both side circumferential zigzag grooves having the branch grooves during the latter stage which the tread has been worn more than 30–70% of the depth of the grooves. In many cases, therefore, such a performance makes it possible to act effectively on relatively weak grounds other than roads.

Figure 2:
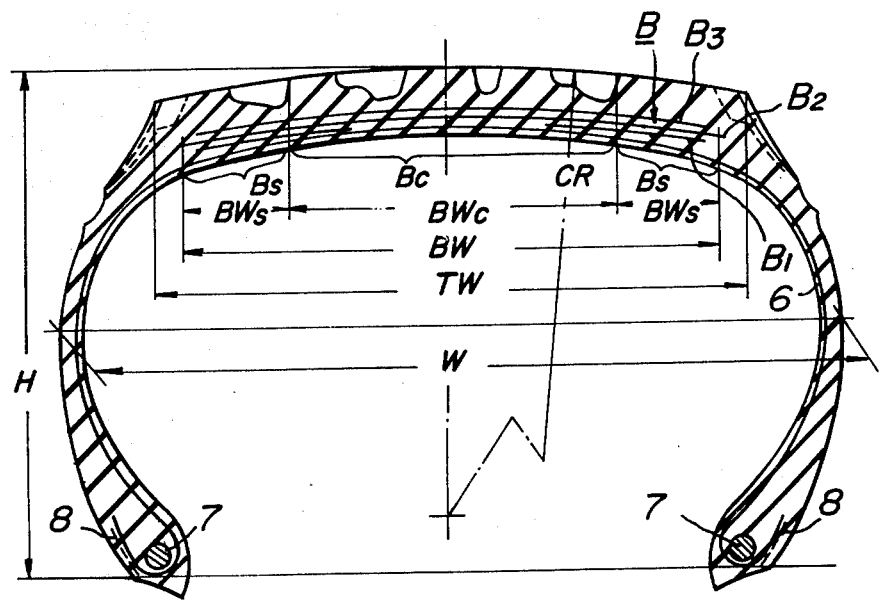
FIG. 2 is a sectional view taken along a line A—A in FIG. 1.

According to the present invention, a crown flatness is 1.5–5.0, preferably 2.0–3.5, which is defined by dividing a radius of curvature CR by a width W of the tire (equipped on normal rims and filled with a normal inner pressure) in a plane including a rotating axis of the tire as shown in FIG. 2. A crown flatness less than 1.5 is not preferable in view of the wear resistance and the prevention of the irregular wear. A crown flatness more than 5.0 necessarily makes thick shoulders which would decrease the durability due to the temperature rise when travelling at high speeds.

According to the invention, the tread 1 is divided into a tread center zone $T_c$ consisting of block patterns and tread side zones $T_s$ whose width is 20–42% of the effective belt width consisting of rib patterns. The width of the side zone $T_s$ more than 42% of the effective belt width is inferior in heat dissipation and heat restriction and prevention of cut chipping. On the other hand, the width of the side zone $T_s$ less than 20% cannot achieve the object of the invention due to low wear-resistance, early wear in the tread size zone $T_s$, irregular wear, noise and increased fuel consumption. The blocks in the center zone $T_c$ are preferably substantially the same in configuration which is in the form of an elongated S shape or mirror symmetrical S shape. The circumferential length of the blocks is 1.3–1.7 times or preferably 1.4–1.5 times of the traverse length. The circumferential length less than 1.3 times of the traverse length tends to lower the wear-resistance and makes larger the deflection of the blocks due to a dynamic load, which may cause various disadvantageous effects such as heating. The circumferential length more than 1.7 times does not achieve the object of the invention due to a difficulty for providing a heat dissipation area.

It is required to maintain the rigidity of the blocks at a level in order to obtain a wear resistance and minimize losses of the blocks. To this purpose, it is desirable that a minimum width of the individual block in any direction at least 25%, preferably more than 35% of the overall traverse width of the block.

Figure 3:
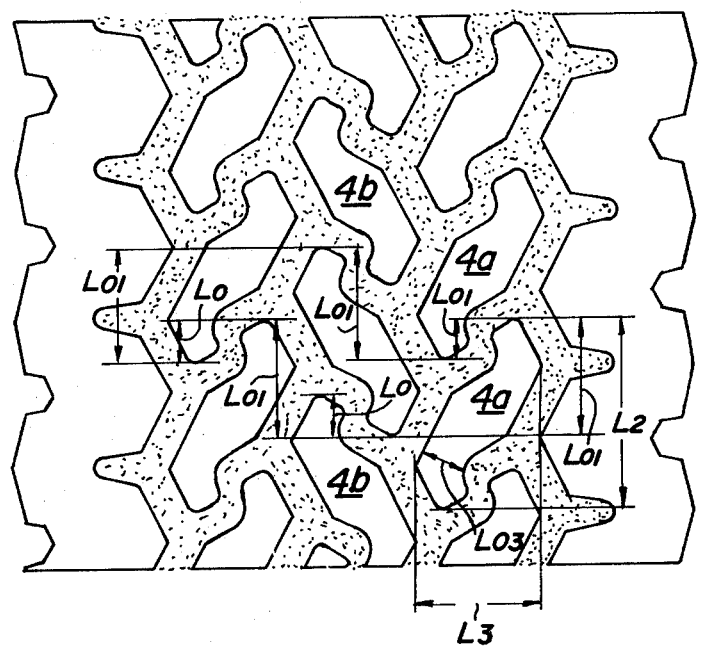
FIG. 3 is a development view of the tread shown in FIG. 1 illustrating the tread patterns in detail.

It is required for the respective blocks in one row to be overlapped as shown in FIG. 3 for restricting the relative movements of the blocks. The overlap ($L_0$) in the row is more than 15%, preferably more than 23% of the circumferential length ($L_2$) of each block. In case of a plurality of rows of the blocks, it is particularly required for the blocks to be circumferentially overlapped $L_{01}$ more than 50% of the circumferential length of the blocks in other row for obtaining a uniform wear-resistance. In case of a plurality of rows of the blocks, it is preferable for an overlap of the blocks in the direction of a rotating axis of the tire to be as minimum as possible in order to remove water and soil between the tire and a road. This is the reason why the circumferential overlaps ($L_0$, $L_{01}$) are necessary.

The one important feature of the tire according to the invention is to provide the platforms in the bias grooves of the tire tread. FIGS. 4 and 4a–4c illustrate the platform in detail. The bias grooves 3 are provided in the mid portions of 30–70%, preferably 30–50% of the groove length ($W_B$) with the platforms which make the depth of the bias grooves shallower 30–70% ($h_1 = 30–70\% \cdot h$), preferably 40–60% of the original depth of the grooves, so that when a new tread of a tire has been worn a certain amount, the block patterns change into the rib patterns with the both side zones.

According to the invention, the widths ($BW_s$) except the center zone width ($BW_c$) from the effective belt width (BW), 80–105% (normally 85–95%) of the tread width (TW) is more than 60%, preferably more than 75–100% of the width ($T_s$) of the tread side zone, so that the areas of ($BW_s$) are rigidly reinforced to keep the rigidity high with the result that the irregular wear in the tread side zones $T_s$ of the tire of this kind is effectively eliminated.

The widths $W_1$ and $W_2$ of the circumferential zigzag grooves 2 (2a, 2b) and traverse or bias grooves 3 are also important, which are measured at right angles to the longitudinal directions of these grooves. The grooves having a narrow width in a conventional block pattern tires used for passenger car are not effective. The widths should be determined in consideration of the size of the blocks and the depth h of the grooves. The widths $W_1$ and $W_2$ the grooves are 0.8–1.3 times of the depth h of the grooves and 0.2–0.3 times of the traverse width $L_3$ of the blocks, these values are important to achieve the objects of the present invention. The widths $W_1$ and $W_2$ may be equal, but are not necessarily equal. They may be determined within the above ranges in connection with the other required performances. The widths $W_1$ and $W_2$ are not necessarily uniform over their lengths. It may of course be locally enlarged or reduced at any portions.

Different from the conventional bias tire (or cross ply tire or diagonal tire), the radial tire includes radially arranged carcass cords that it is required to provide members supporting circumferential forces at right angles to the radial direction (circumferential tension support members). Such a member consists of at least two layers of rubber coated cords. The cords in the layer are parallel to each other at an angle less than 30° with respect to the circumferential direction and the cords in the different layers cross to each other. The widths of these layers in the sectional plane including the rotating axis of the tire are not equal, so that the effective belt width is defined by an average width.

Figure 1:
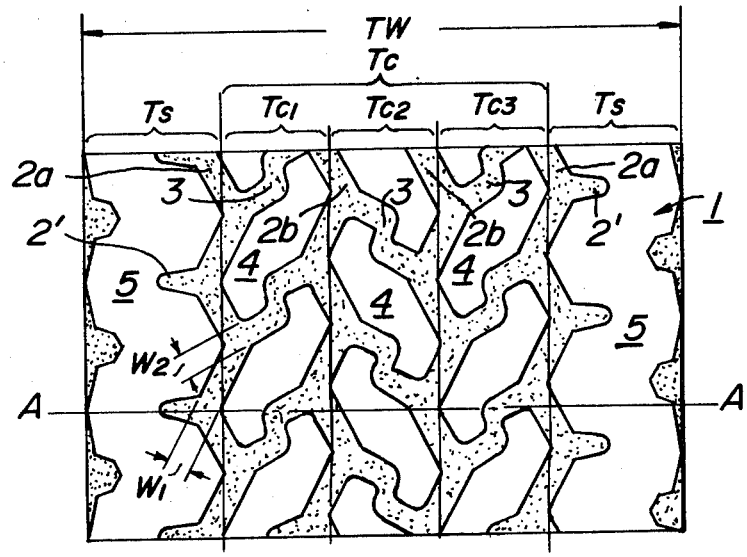
FIG. 1 is a partial development view of a tread according to the invention.

In the embodiments explained in the specification, tires of 18R22.5 were used. FIG. 1 is a development view of a tread of a tire according to the invention. FIG. 2 is a sectional view taken along line A—A in FIG. 1.

The tire according to the invention is a heavy duty pneumatic tire having a tread 1 divided by two circumferential zigzag grooves 2 into a tread center zone $T_c$ and remaining side zones $T_s$. The side zone $T_s$ consists of circumferentially continuous ribs 5 as shown in FIG. 1. The center zone $T_c$ includes a block pattern consisting of three rows of blocks 4 circumferentially discontinuous with uneven bias grooves 3. When there are three rows of blocks, two circumferential zigzag grooves 2b are arranged in addition to two circumferential zigzag grooves 2a according to the invention as shown in FIG. 1. The zigzag grooves 2b have a depth h substantially the same as that of the zigzag grooves 2a. The bias grooves 3 are provided in their center portions 30-70% their length with platforms 9 (FIG. 4) which made the depth of the grooves thereat 30-70% shallower than the original depth of the grooves 3, so that the pattern in the tread consists of the blocks and ribs when the tread has not yet been worn but it converts into a rib pattern (FIGS. 5 and 6) formed by the circumferential zigzag grooves 2a and 2b having branch grooves 2' as the result of the fact that the blocks in the center zone become circumferentially continuous with the aid of the platforms when the tread has been worn more than 30-70% in the later stage. Such a converted pattern improves a heat dissipation and block movements and thus wear-resistance as a whole to prevent a wear in an initial stage or irregular wear.

FIGS. 4a and 4b illustrate sections taken along lines I—I and II—II in FIG. 4, respectively, where h is a depth of the zigzag groove 2, $h_1$ is a height of the platform and $h_2$ is a depth of the bias groove 3 at the platform.

Figure 6:
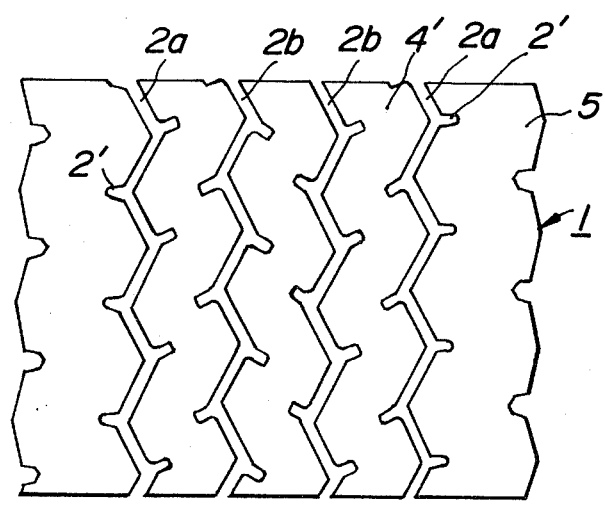
FIG. 6 is a development view of a tread according to the invention showing a pattern when the tread has worn 75%.

FIG. 4c is a sectional view taken along the line X—X in FIG. 4, wherein the numeral 11 designates the outer surface of the platform 9. FIGS. 5 and 6 illustrate the patterns in the tread when a tire according to the invention has worn 50% and 75%, respectively.

The inventors experimented the tires having the above constitutions of patterns about wear-resistance, durability and other performances and have found them to be superior to the prior art tires.

In a preferred embodiment of the tire according to the invention, a tread 1 having a tread width TW of 350 mm is divided into the tread center zone $T_c$ of 190 mm width and the side zones $T_s$ of 80 mm width by the circumferential zigzag grooves 2a having a depth h of 16 mm and a width $W_1$ of 15 mm. The side zones $T_s$ form circumferentially continuous rib patterns including branch grooves 2' circumferentially spaced at an internal for improving the ground contactability. The branch groove 2' has a progressively spread width toward the circumferentially zigzag groove 2a, of which maximum width at a location of a connection with the groove 2a is 15 mm equal to the width $W_1$ of the zigzag groove 2a. The center zone $T_c$ includes three rows of blocks defined by the four circumferential zigzag grooves 2a and 2b and the three rows of a plurality of bias grooves circumferentially arranged at an interval for laterally connecting the circumferential zigzag grooves. The width $W_2$ of the bias grooves 3 is 15 mm equal to the width $W_1$ of the circumferential zigzag grooves 2. It should be understood that the widths $W_1$ and $W_2$ which are about 90% of the depth h are sufficiently wide. The blocks 4 in the respective rows are the same S shape or mirror symmetrical S shape. The traverse length $L_3$ of the block 4 in an axial direction of the tire (FIG. 3) is 67 mm which is about 4.5 times of the width $W_1$ of the zigzag groove 2. The circumferential length $L_2$ of the block 4 is 96 mm which is about 1.4 times of the traverse length $L_3$. It is required to form the block 4 in an elongated S shape having the circumferential length $L_2$ which is 1.3-1.7 times, preferably 1.4-1.5 times of the traverse length $L_3$ for improving the wear-resistance and preventing the irregular wear. The elongated S shape or mirror symmetrical S shape of the blocks is effective to prevent the irregular wear.

The side zones $T_s$ consist of the circumferentially continuous ribs 5 of the width 80 mm as above described having an inherent great rigidity and are firmly reinforced by the ends BS of the belt having the width $BW_s$ which is 20% of the effective belt width BW, so that the rigidity of the side zones $T_s$ is maintained remarkably high to prevent the irregular wear.

Referring to FIG. 2, the belt B is formed by first, second and third laminated belts $B_1$, $B_2$ and $B_3$ which are made of cloth layers including rubber coated steel cords of which angles to the circumferential direction of the tire are left-handed 65°, right-handed 20° and left-handed 20°, respectively. The first belt $B_1$ is a supplementary belt layer. The second and third belt $B_2$ and $B_3$ are tension members for supporting the circumferential tensile forces acting upon the tread. The effective belt width of the belt B is the mean value 318 mm of the widths 330 and 305 mm of the second and third belts $B_2$ and $B_3$. A carcass ply 6 consists of cloth layers including rubber coated steel cords extending in planes including a rotating axis of the tire. This tire shown in FIG. 2 is so-called a "one ply steel radial tire."

Chaffer layers 8 are made of metal cords to reinforce folded ends of the carcass ply 6 about bead cores 7.

An aspect ratio of the tire shown in FIGS. 1 and 2, that is a ratio of the height H (294 mm) to the maximum width W (450 mm), is 0.65. In case of very flat tire having as aspect ratio of less than 0.85, particularly 0.5-0.75, a high design technique is required to solve the problems of heating, wear, irregular wear and the like. An application of the present invention makes it easy to design such very flat tires.

A radius CR of curvature in the plane including the rotating axis of the tire is 1,400 mm. The flatness of the tire as above described is 3.1. An overlapped distance $L_0$ of the respective blocks 4a and 4a or 4b and 4b in the same circumferential row is 20.5 mm and a ratio of the overlapped distance $L_0$ to the circumferential length $L_2$ (96 mm) of the block 4 is 21% ($L_0/L_2 \times 100 = 21\%$) (FIG. 3). An overlapped distance $L_{01}$ of the blocks 4a and 4b in the adjacent rows is 58.5 mm and a ratio of the overlapped distance $L_{01}$ to the circumferential length $L_2$ (96 mm) of the block is 61% ($L_{01}/L_2 \times 100 = 61\%$). A minimum width $L_{03}$ of the block is 19 mm and a ratio of the width $L_{03}$ to the traverse width $L_3$ (67 mm) is 28% ($L_{03}/L_3 \times 100 = 28\%$).

FIG. 4 is a partially enlarged development view of the traverse or bias grooves 3 defining the respective blocks in the rows.

According to the present invention, each platform 9 is provided in the groove between the blocks 4a to connect the blocks when the tread has been worn 30-70% to reinforce the center zone $T_c$ of the tread thereby preventing the extremely rapid decrease of the life of the tire due to wear and thus preventing the decrease of the heavy load carrying ability of a flat wide base tire. Referring to FIG. 4c, the length of the bias groove 3 is $W_B$ and the length of the platform 9 is P. The ratio of the length P (20 mm) of the platform to the length $W_B$ (47.5 mm) of the bias groove is 42%. The ends of the platform is smoothly continuous to the circumferential groove 2 with a radius of curvature. A ratio of the length P of the platform 9 to the length $W_B$ of the bias groove 3 is preferably at least 30-70%.

Figure 7:
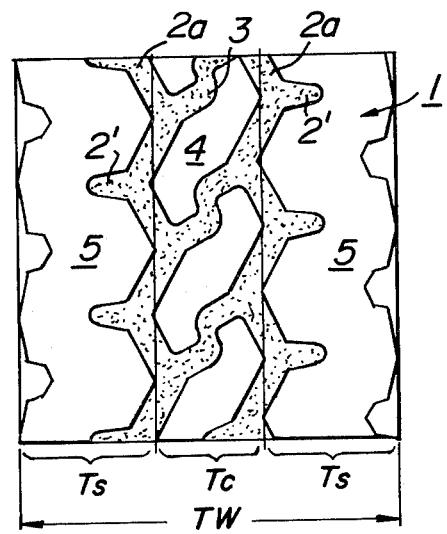
FIG. 7 is a development view of a tread including one row of block patterns in its center zone according to the invention.
Figure 8:
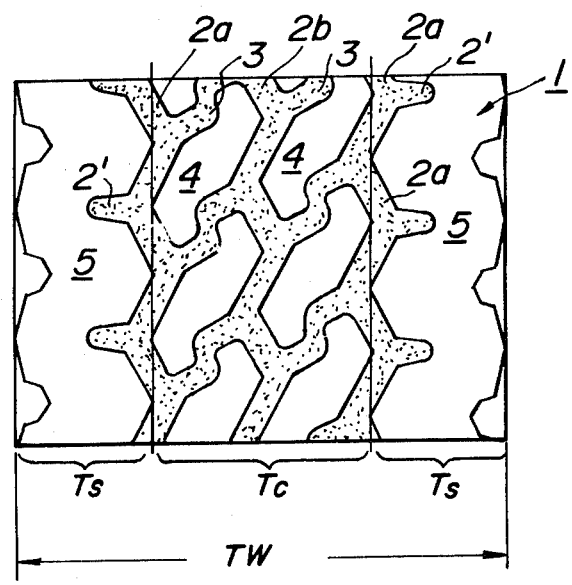
FIG. 8 is a development view of a tread including two rows of block patterns in its center zone according to the invention.

FIGS. 7 and 8 illustrate other preferred embodiments of the tire according to the invention. In the embodiment shown in FIG. 7, a center zone $T_c$ having a width $T_c$ which is about 30% of the effective belt width BW consists of one row of block patterns defined by circumferential zigzag grooves 2a and circumferentially discontinuous with bias grooves 3 therebetween. Remaining side zones $T_s$ consist of circumferentially continuous ribs. Each bias groove between the block patterns is provided in its center portion 30-70% of its length with a platform to make the groove 30-70% shallower, thereby providing a pattern of blocks and ribs when the tread has not been worn at the initial stage to facilitate the continuous travelling with a heavy load on a hard road and on a weak ground other than roads. When the tread has been worn 30-70% in the later stage of travelling, the platforms cause the discontinuous block pattern to be circumferentially continuous to reinforce the center zone of the tread thereby eliminating the disadvantages of the tires for hard and weak roads, such as breakdown due to overheating, decrease of travelling life due to rapid wear and irregular and local wear, increase of fuel consumption due to increased rolling resistance, and increase of noise.

FIG. 7 exemplarily illustrates the tire tread of the center zone of one row of block pattern, wherein the ratio $T_c$/BW of the width $T_c$ of the center zone to the effective belt width BW is about 36% and the ratio $T_s$/BW of the width $T_s$ of the side zones to the effective belt width BW is about 40%.

FIG. 8 illustrates the tire tread of the center zone circumferentially divided by three zigzag grooves 2, to form two rows of block patterns, wherein ratio $T_c$/BW of the width $T_c$ of the center zone to the effective belt width BW is about 53% and the ratio $T_s$/BW of the width $T_s$ of the side zones to be effective belt width BW is about 30%. In FIG. 8, the blocks 4 in the two adjacent rows are arranged parallel to each other in the center zone. Bias grooves 3 are arranged for communicating between the center zigzag groove 2b and side zigzag grooves 2a having branch grooves 2' in axial direction of the tire at locations of bent portions of the zigzag grooves at an equal interval. The pattern in FIG. 8 is improved in two rows of block patterns in the center zone in comparison with one row of block pattern in FIG. 7.

The pattern shown in FIG. 1 includes three rows of block patterns in the center zone wherein the blocks in the mid portion of the center zone $T_{c2}$ and the blocks in the side portions are not parallel but crossing with each other. The number of rows of block patterns is more than that in FIG. 8, so that the tires having the patterns as shown in FIG. 1 are particularly effective for use in large-sized heavy duty pneumatic radial tire. Moreover, according to the invention, the platforms 9 having a height $h_1$ are provided in the bias grooves 3 located between the blocks in the three rows of block patterns so as to make shallower 30-70% the original depth of the grooves 3, thereby enabling the tires according to the invention to travel mainly continuously on hard roads with heavy loads and avoid various disadvantages in the prior art tires for on-road and off-road, such as breakdown due to overheating, decrease of travelling life due to rapid wear and irregular and local wear, increase of fuel consumption due to increased rolling resistance, and increase of noise.

The tires according to the invention are suitable as wide base tires which are flat and have a large load support capacity for heavy duty cars such as dump trucks, concrete mixer trucks, garbage trucks or motor trucks for refuse collection and the like.

It is further understood by those skilled in the art that the foregoing description is preferred embodiments of the disclosed tires and that various changes and modifications may be made in the invention without departing from the spirit and scope thereof.

What is claimed is:

1. A pneumatic tire for a heavy duty vehicles, comprising a tread divided by two circumferential zigzag grooves in a tread center zone and remaining side zones consisting of circumferentially continuous ribs, said tread center zone including block patterns of elongated blocks circumferentially discontinuous with traverse grooves, said traverse grooves being provided in their substantially mid portions 30-70% of their lengths with platforms rendering said traverse grooves shallower 30-70% than their original depths, widths of said traverse grooves measured perpendicularly to their lengthwise direction being 0.2-0.3 times of the traverse length of said blocks, each said side zone $T_s$ having a width which is 20-42% of an effective width BW of a belt, and 75-100% of said width of each said side zones being firmly reinforced by said belt, thereby forming in a surface of said tread a pattern of blocks and ribs when said tire is relatively new, said pattern being capable of converting as a whole into another pattern of ribs formed by said circumferential zigzag grooves having branch grooves when said tread has worn more than 30-70%.

2. A pneumatic tire as set forth in claim 1, wherein said traverse grooves are arranged oblique to a center line of the tread.

3. A pneumatic tire as set forth in claim 1, wherein said blocks in said center zone have a length in a circumferential direction of the tire, which is 1.3-1.7 times of that of said blocks in a direction of a rotating axis of the tire.

4. A pneumatic tire as set forth in claim 1, wherein a crown flatness of the tire is 1.5-5.0, which is defined by dividing a radius of curvature CR of said tread by a width W of said tread in a plane including a rotating axis of the tire.

5. A pneumatic tire as set forth in claim 1, wherein a minimum width in any direction of said individual blocks in said rows in said center zone is more than 25% of an overall length of one block in a direction of a rotating axis of the tire.

6. A pneumatic tire as set forth in claim 1, wherein circumferentially overlapped lengths $L_0$ of the blocks in one row in the center zone of the tread are more than 15% of the circumferential length of the blocks.

7. A pneumatic tire as set forth in claim 1, wherein circumferentially overlapped length $L_{01}$ of the blocks in the adjacent rows of a plurality of rows in the center zone of the tread are more than 50% of the circumferential length of the blocks.

8. A pneumatic tire as set forth in claim 1, wherein an effective width BW of a belt is 80–105% of the width TW of the tread.

9. A pneumatic tire as set forth in claim 1, wherein widths of said circumferential zigzag grooves and said traverse grooves measured perpendicularly to their lengthwise direction are 0.8–1.3 times of their depths and the width of said zigzag grooves are 0.2–0.3 times of the traverse length of said blocks.

10. A pneumatic tire as set forth in claim 1, wherein said block patterns in said center zone consist of one to three rows of block patterns divided by circumferential zigzag grooves, respective blocks being circumferentially divided by bias grooves, and said bias grooves being provided in their substantially mid portions 30–70% of their lengths with platforms rendering said bias grooves shallower 30–70% than their original depths.

* * * * *